United States Patent
Tikka

(10) Patent No.: US 6,999,775 B1
(45) Date of Patent: Feb. 14, 2006

(54) METHOD OF CONTROLLING LOAD IN MOBILE COMMUNICATION SYSTEM BY DTX PERIOD MODIFICATION

(75) Inventor: Mauri Tikka, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/402,646

(22) PCT Filed: Apr. 9, 1998

(86) PCT No.: PCT/FI98/00322

§ 371 (c)(1),
(2), (4) Date: Jan. 10, 2000

(87) PCT Pub. No.: WO98/47299

PCT Pub. Date: Oct. 22, 1998

(30) Foreign Application Priority Data

Apr. 11, 1997 (FI) ................................. 971538

(51) Int. Cl.
*H04Q 7/20* (2006.01)
*H04B 1/00* (2006.01)

(52) U.S. Cl. .................. 455/453; 455/70; 455/67.11
(58) Field of Classification Search ............ 455/68, 455/70, 69, 67.11, 67.13, 453, 517, 424, 63.1, 455/423, 563; 370/330, 332, 333, 336, 337, 370/345, 347, 436, 442, 458, 478, 498, 229, 370/230, 235; 704/233
See application file for complete search history.

(56) References Cited

U.S. PATENT DOCUMENTS 5,459,814 A   10/1995   Gupta et al. ............... 704/233
5,754,537 A *  5/1998   Jamal ........................ 370/330
5,790,534 A *  8/1998   Kokko et al. .............. 370/335
5,835,486 A * 11/1998   Davis et al. ................ 370/347
5,953,666 A *  9/1999   Lehtimäki .................. 370/345
5,960,389 A *  9/1999   Jarvinen et al. ........... 704/220

FOREIGN PATENT DOCUMENTS

| EP | 0 415 898 | 3/1991 |
|---|---|---|
| EP | 0 709 982 | 5/1996 |
| EP | 0 831 669 | 3/1998 |
| WO | 95/22857 | 8/1995 |
| WO | 96/42142 | * 12/1996 |

OTHER PUBLICATIONS

2nd International Conference on Universal Personal . . . , vol. 2, May 1994, David M Rodriquez Ph.D. et al, "Outage Probability in Discontinuous Transmission For Cullular Systems", p. 574, left hand column, line 27-right hand column, line 33, p. 579, left hand column, line 7—right hand column, line 25.

IEEE Global Telecommunications Conference . . . , vol. -, Nov. 1989, (Dallas, Texas), C B Southcott et al, "Voice Control of the Pan-European Digital Mobile Radio System.", p. 1070-p. 1074.

* cited by examiner

Primary Examiner—Rafael Perez-Gutierrez
(74) Attorney, Agent, or Firm—Pillsbury Winthrop Shaw Pittman LLP

(57) ABSTRACT

The present invention relates to a method of controlling load in a mobile communication system in a system in which mobile stations include means for utilizing discontinuous transmission. In order to utilize the traffic capacity of the system more efficiently than before, at least one mobile station is equipped with regulation means for regulating its parameters related to discontinuous transmission, and a control signal is transmitted via a radio path to the at least one mobile station for regulating its parameters related to discontinuous transmission in such a manner that the mobile station transmits telecommunication signals to the other parts of the system more seldom or more often.

7 Claims, 5 Drawing Sheets

Figure 1A:
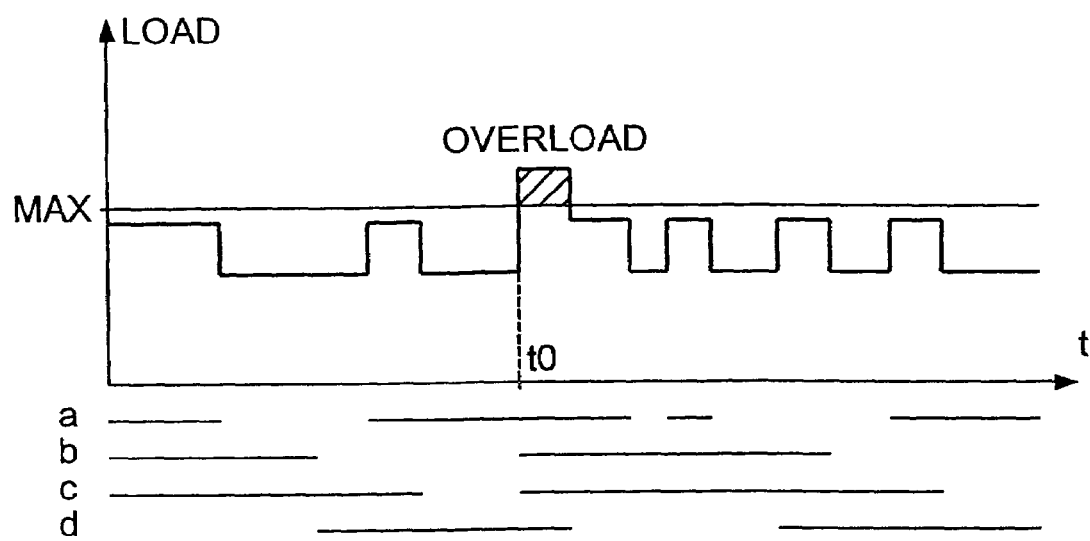

METHOD OF CONTROLLING LOAD IN MOBILE COMMUNICATION SYSTEM BY DTX PERIOD MODIFICATION

The present invention relates to a method of controlling load in a mobile communication system in a system in which the mobile stations comprise means for utilizing discontinuous transmission. The invention further relates to a mobile communication system comprising a mobile exchange, base stations in a data transmission connection to the mobile exchange, and mobile stations in a radio connection to the base stations, said mobile stations comprising means for utilizing discontinuous transmission. The invention further relates to a mobile station comprising transmission means and reception means for receiving and transmitting telecommunication signals via a radio path, a user interface for receiving voice signals, and control means for utilizing discontinuous transmission, the control means comprising signal processing means for processing the voice signals received through the interface by utilizing parameters stored in the mobile station for detecting speech from the voice signals received through the interface.

The present invention relates to controlling the load in a mobile communication system in which the mobile stations can utilize DTX (Discontinuous Transmission). The GSM system (Global System for Mobile Communications) is an example of this sort of system.

Discontinuous transmission aims to prolong the life of a battery in a mobile station by shortening the time a radio transmitter is in use. Furthermore, by reducing radio traffic, discontinuous transmission reduces disturbing interference on a radio path. In order to achieve these objects, in discontinuous transmission a mobile station transmits radio signals only when the user is speaking on it. In other words, the transmission to the radio path is interrupted during the breaks in speech. On the receiving side, pseudo noise, in other words comfort noise, is generated during the breaks in speech when no speech frames are received from a radio path. The parameters describing background noise are computed on the transmitting side and transmitted to the receiving side in the last frame, shortly before the transmission is interrupted. In addition to this, they are transmitted at regular intervals in the signaling channel.

In the GSM system, a mobile station encodes speech in 20 ms sequences in such a manner that a codec forms a set of parameters from each 20 ms voice sample. The size and structure of this parameter set is dependent on the codec used; there are several different codecs available. To transmit speech in the GSM system is thus to transmit encoded blocks.

To ensure the utilization of discontinuous transmission, a mobile station needs VAD (Voice Activity Detection) by means of which it can be examined whether a particular voice signal comprises speech or merely background noise. A GSM mobile station utilizing discontinuous transmission encodes speech at a rate of 13 kbit/s while the user is speaking, and at other times (in other words when the user is not speaking) at a rate of around 500 bit/s. The rate is sufficient for transmitting background noise to the other party of the call in order to make him/her notice that the call has not been disconnected.

There are various algorithms by means of which an encoded block comprising silence or background noise and a block comprising speech can be discriminated from each other. Usually the algorithm used is dependent on the encoding method used. The aim is to select the DTX parameters in such a manner that speech and background noise could be reliably discriminated from each other. By regulating these parameters DTX can be made to function in such a manner that even extremely quiet speech can start a transmission or, on the contrary, a DTX parameterization by which a transmission is not easily started can be provided.

The capacity of a mobile network is usually dimensioned in such a manner that the network is able to transmit the load peaks occurring normally. In other words, not every individual mobile station within the system has data transmission capacity continually reserved for it, but in conjunction with designing the network the aim has been to estimate the maximum capacity need, according to which the network has been dimensioned. In practice this means that mobile stations use existing data transmission capacity alternately, and if the number of simultaneously active (a call is in progress) mobile stations exceeds the number for which the capacity has been dimensioned, the mobile communication system fails to serve all mobile stations. Since it is extremely difficult to estimate the right capacity need in advance, in practice situations occur in which the capacity of a mobile communication system runs out.

A way to ensure that the capacity of a mobile communication system is sufficient is, of course, to increase the capacity of the network, in other words to dimension the network for a greater maximum capacity than before. This, however, means increasing costs since in practice the result would be an over-dimensioning in which the network would have to be dimensioned for such a heavy traffic load which in practice would never exist on it.

An object of the present invention is to provide a solution for controlling load in a mobile communication system in such a manner that an existing traffic capacity can be utilized more efficiently than before to make it possible to serve a larger number of mobile stations than before, without a need to increase the capacity of a network, which would increase equipment costs. This object is achieved with the method of the invention, which is characterized in that at least one mobile station is equipped with regulation means for regulating its parameters related to discontinuous transmission, and a control signal is transmitted via a radio path to at least one said mobile station for regulating its parameters related to discontinuous transmission in such a manner that the mobile station transmits telecommunication signals to the other parts of the system more seldom or more often than before.

The invention is based on the idea that when a control signal can be transmitted from a mobile network via a radio path to the mobile stations of the system, said control signal enabling the mobile stations to regulate their parameters related to discontinuous transmission in such a manner that the mobile stations less often transmit radio signals to the other parts of the system, capacity can be released in the network in such a manner that the number of the mobile stations which can be simultaneously served by the network increases. In other words, when it is noted that the load of the mobile network is approaching the maximum capacity of the network, the capacity in use can be released by ordering the mobile stations to transmit more seldom than before, whereby a larger number of mobile stations can be served at a particular capacity than before. In accordance with the invention, in some situations the mobile stations can be similarly controlled to regulate their parameters related to discontinuous transmission in such a manner that the mobile stations transmit radio signals to the other parts of the system more often than before.

The most essential advantages of the method of the invention are that it enables the existing capacity of a mobile network to be utilized more efficiently than before, that a larger number of mobile stations can be served at the existing capacity than before, whereby equipment costs associated with increasing the capacity are avoided, and that the method of the invention can be applied to already existing mobile networks by extremely small changes, which can mainly be implemented by software modifications.

The invention further relates to a mobile communication system in which the method of the invention can be applied. The system of the invention is characterized in that the system comprises monitoring means for monitoring the traffic load in different parts of the system, control means responsive to the monitoring means for transmitting a predetermined control signal to certain mobile stations or mobile stations located in a certain area via a radio path when the monitoring means indicate that the traffic load in some part of the system exceeds the predetermined limit, and mobile stations comprising regulation means for regulating their parameters related to discontinuous transmission in response to the reception of the control signal in such a manner that said mobile stations more seldom or more often transmit data communication signals to the other parts of the system.

An essential advantage is achieved particularly in a mobile communication system in which the data transmission connection between a base station and a mobile exchange is packet switched, when monitoring means are arranged to monitor at least the amount of the free traffic capacity of the telecommunication connection between the base station and the mobile exchange and to transmit a control signal to mobile stations communicating with the base station when the free capacity drops beneath the limit value. In such a case, a reduction in the number of speech frames transmitted by the mobile stations via a radio path directly reduces the number of packets transmitted on the data transmission connection, in other words the amount of free capacity increases.

When the control means control the free traffic capacity of the radio channels of a certain base station or alternatively the quality of a call transmitted via one or several predetermined base stations, the control means detect when the load in a particular base station is becoming too heavy. In the CDMA (Code Division Multiple Access) system, for example, this can be seen in transmission power exceeding a certain limit. In such a case, an attempt can be made to release traffic capacity in the area of the CDMA system in question by commanding the mobile stations to transmit speech frames less often.

In a mobile communication system similar to the CDMA a radio interface does not precisely restrict the number of calls taking place in the area of one base station, but the calls have a practical limit, and to exceed this limit leads to degraded voice quality of the calls. In this sort of "soft capacity" system, an attempt can be made to increase the capacity (by reducing interference) by the solution of the invention, which reduces interference in a base station environment.

The invention further relates to a mobile station which can be utilized in the system of the invention. The mobile station of the system is characterized in that the mobile station comprises detection means for detecting a predetermined control signal received by reception means via a radio path, and regulation means, responsive to the detection means, for changing said parameters utilized in speech detection by signal processing means in such a manner that the signal processing means interpret the voice signals received through a user interface as background noise more seldom than before or more often than before.

The preferred embodiments of the method and the mobile communication system of the invention are disclosed in the attached dependent claims 2 to 3 and 5 to 9.

Figure 1B:
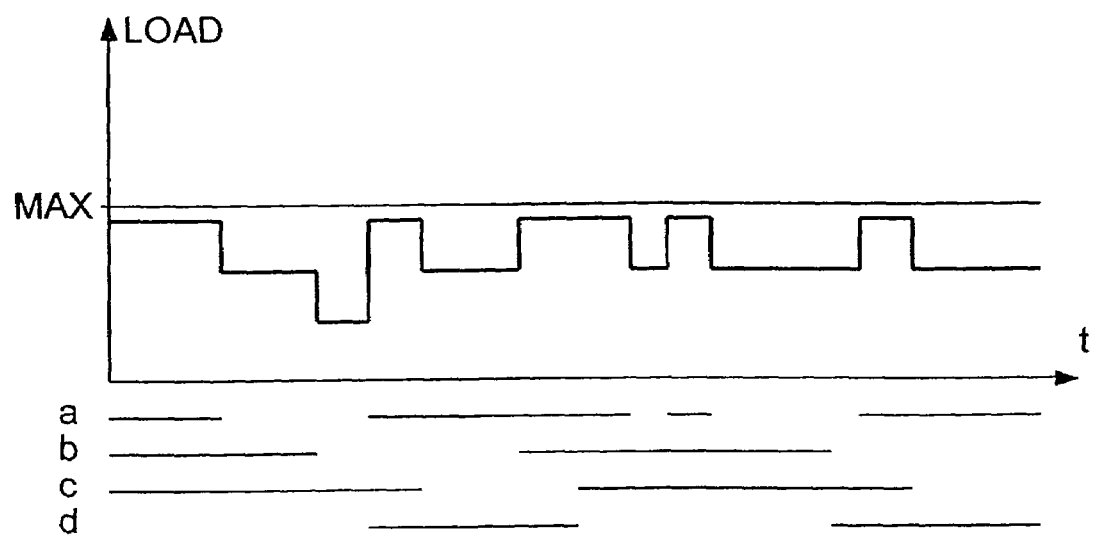
Figure 2:
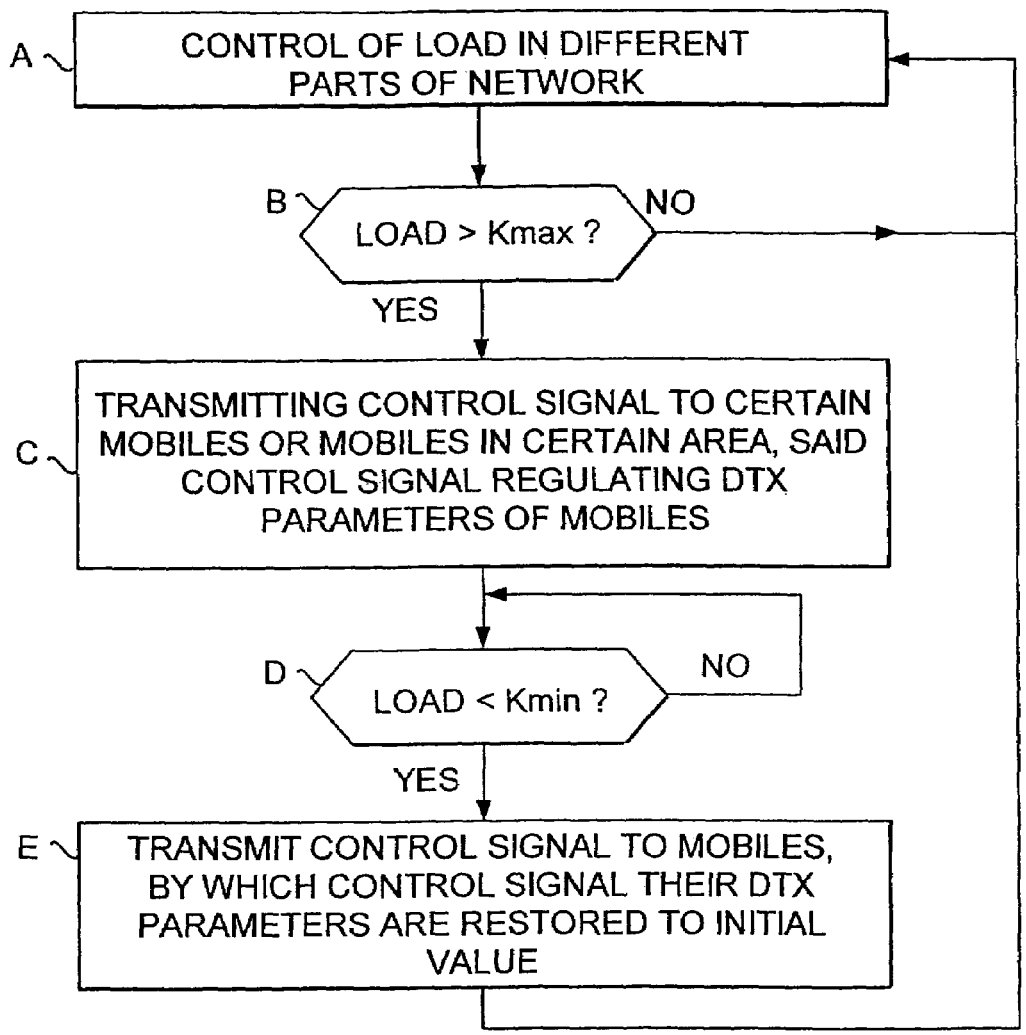
Figure 3:
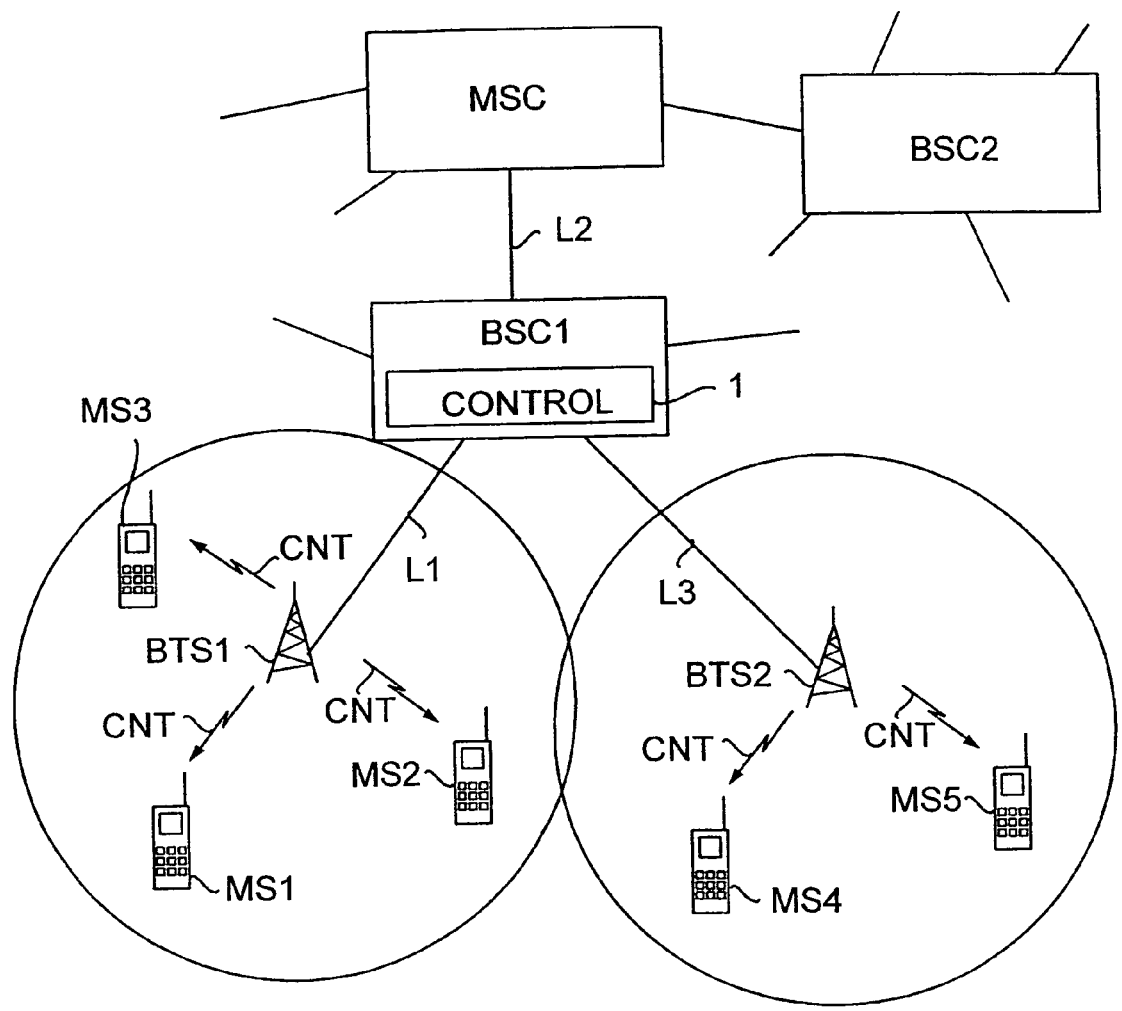
Figure 4:
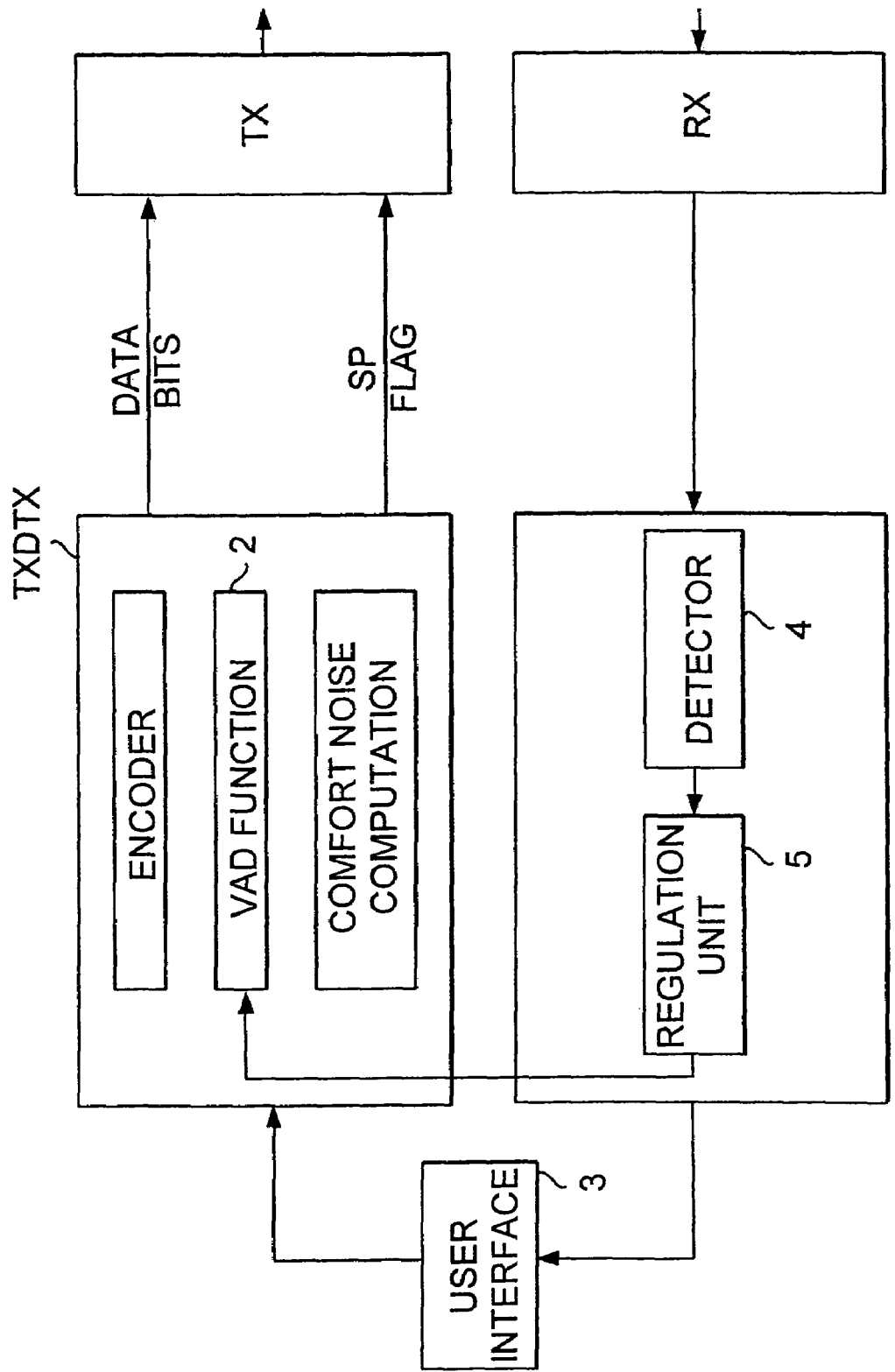
Figure 5:
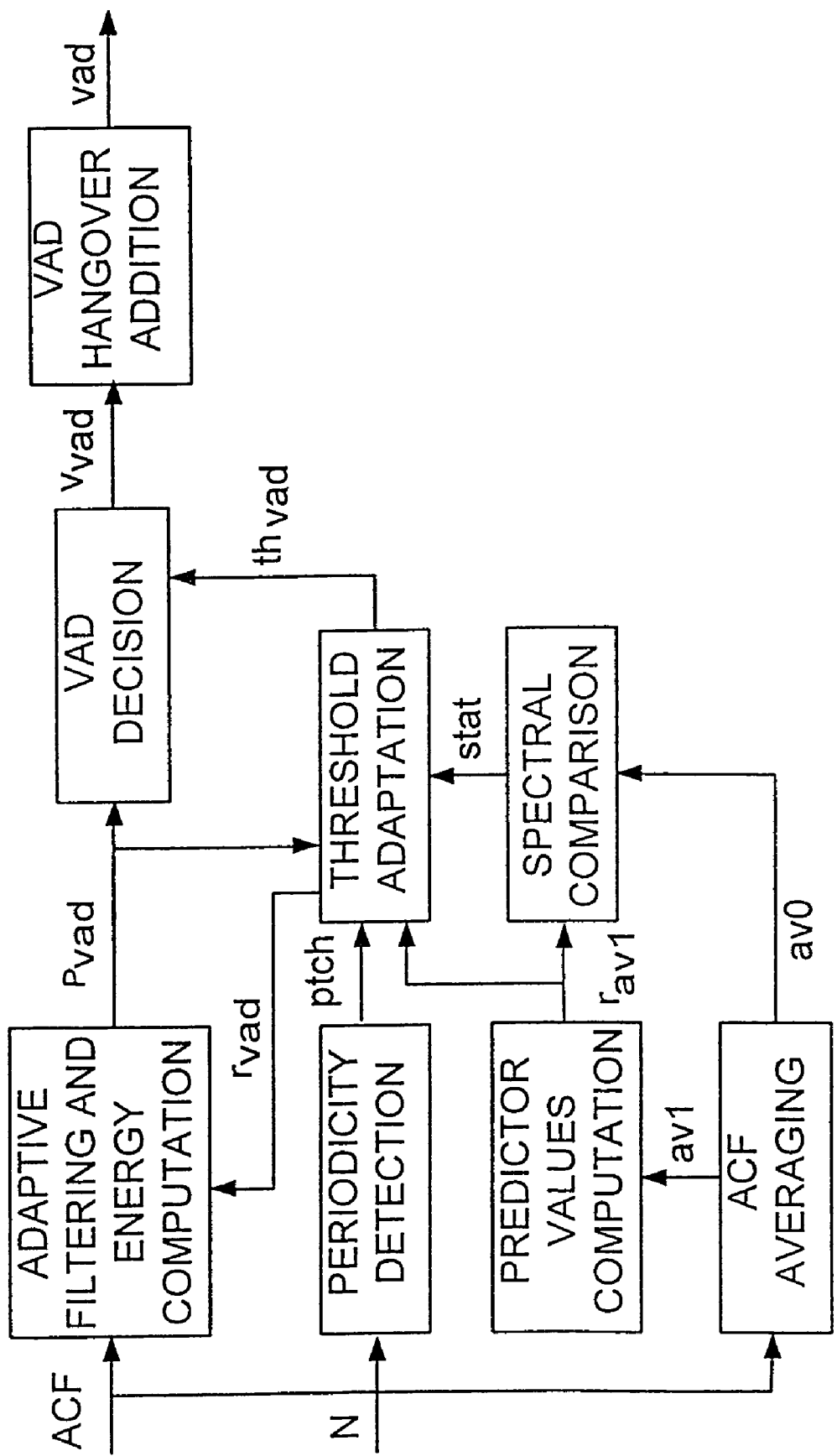

The invention will be described in closer detail in the following by way of example with reference to the attached figures, in which FIGS. 1A and 1B illustrate the load in a mobile communication system, FIG. 2 shows a flow diagram of a first preferred embodiment of the method of the invention, FIG. 3 shows a block diagram of a first preferred embodiment of the mobile communication system of the invention, FIG. 4 shows a block diagram of a preferred embodiment of the mobile station of the invention, and FIG. 5 illustrates the VAD function of the mobile station of FIG. 4.

FIGS. 1A and 1B illustrate the load in a mobile communication system. FIGS. 1A and 1B can be assumed to describe the load in a data transmission connection between a single base station and a mobile exchange, for example, whereby the vertical axes describe load and the horizontal axes time t. In FIGS. 1A and 1B, the allowed maximum load MAX is indicated by the horizontal line, whereby the total data transmission capacity available is in use.

FIG. 1A illustrates the load in a mobile network when the network is used by four mobile stations a to d. For the mobile stations, a horizontal line is drawn when a mobile station transmits speech blocks. The figure shows that at time instant t0 all four mobile stations transmit speech blocks simultaneously, whereby the load in the network exceeds its maximum limit, in other words the network fails to serve all mobile stations without interference.

Similarly, FIG. 1B illustrates the load of the same mobile station as in the case of FIG. 1A, but the method of the invention is applied to it, in other words, when the limit of the maximum load MAX of the network is approaching, the network transmits a predetermined control signal to the mobile stations to regulate the parameters related to their discontinuous transmission in such a manner that the mobile stations transmit speech frames less often than before. The load peak can thus be balanced, and no overload similar to that in FIG. 1A occurs. For each mobile station, the change in the number of speech frames to be transmitted can be very small indeed, but the regulation is all-important to the entire network (or a part of the network).

FIG. 2 shows a flow diagram of a first preferred embodiment of the method of the invention.

In block A of FIG. 2 the load in different parts of the network is monitored. Between a base station and a mobile exchange in a packet switched transmission network, the number and/or size of the packets to be transmitted can be monitored, for instance. In the radio interface of a mobile network, the quality of connections in progress, for example, such as the bit error ratio, signal/noise ratio, or transmission powers (particularly in the CDMA systems) or corresponding parameters, which help to form a picture of the interference level in a base station environment, can be monitored.

In block B it is checked whether the load in some part of the mobile network is heavier than the reference value Kmax determined for it.

In block C a control signal making the mobile stations regulate their parameters related to discontinuous transmission in such a manner that said mobile stations transmit speech frames less often than before, is transmitted to those mobile stations which utilize the part of the network where the load exceeds the reference value Kmax. This can be achieved, for instance, by regulating those parameters which the mobile stations utilize for discriminating speech and background noise, whereby the mobile stations interpret the voice signals received via their microphones as background noise more easily than before.

In block D it is checked whether the load in a mobile network (in the same part of the network in which the load in block B exceeded the reference value Kmax) drops below another reference value Kmin. If this is the case, it means that the load peak of the network is passed, which means a transfer to block E where a control signal making mobile stations regulate their parameters related to discontinuous transmission to their initial values, is transmitted to said mobile stations utilizing the part of the network in question.

As distinct from the block diagram in FIG. 2, the parameters related to discontinuous transmission in mobile stations can also, of course, be steplessly regulated in such a manner that the regulation takes place steplessly in response to the traffic load of a network.

FIG. 3 shows a block diagram of a first preferred embodiment of the mobile communication system of the invention. It can be assumed by way of example that the part of the mobile network shown in FIG. 3 is a part of the CDMA mobile network.

The mobile exchange MSC shown in FIG. 3 communicates with base station controllers BSC1 and BSC2 via packet switched connections, and in the case of FIG. 3, the base station controller BSC1 communicates with base stations BTS1 and BTS2 via packet switched connections L1 and L3.

In FIG. 3, the base station controller BSC1 is equipped with monitoring means 1 through which it monitors the load in the data transmission connections L1, L2 and L3. Furthermore, the base station controller monitors the transmission powers of the mobile stations in the radio cells of the base stations BTS1 and BTS2 (in the CDMA system, the transmission powers of a mobile station depend on the load in the radio cell in question). The monitoring means 1 thus note if some part of the network becomes too heavily loaded.

When the monitoring means 1 detect that the load of the data transmission connection L2, for example, is approaching its maximum allowed value, the monitoring means control the base stations BTS1 and BTS2 to transmit a predetermined control signal CNT to all mobile stations located in their radio coverage area. Said control signal is preferably transmitted as a cell broadcast in some broadcast control channel, in which also other data intended to all mobile stations, such as data on the calling channels of the radio cell, is transmitted. The control signal can thus be transmitted to the largest possible number of mobile stations at the same time. Alternatively, the control signal can be transmitted to each mobile station one by one by utilizing an existing signaling channel.

In FIG. 3, mobile stations MS1 to MS5 utilize discontinuous transmission in a manner known per se, in addition to which they are, in accordance with the invention, equipped with regulation means for regulating their parameters related to discontinuous transmission in response to the data contained in the control signal CNT. Subsequent to said regulation, the mobile stations MS1 to MS5 transmit speech blocks to the base stations BTS1 and BTS2 less often than before, whereby the base stations BTS1 and BTS2 correspondingly strain the packet switched connection L2 between the base station controller BSC1 and the mobile exchange MSC less than before.

FIG. 4 shows a block diagram of the first preferred embodiment of the mobile station of the invention. The mobile station in FIG. 4 can be a GSM system mobile station, for instance.

In FIG. 4, the parts related to discontinuous transmission are shown in block TXDTX (Transmit DTX). From block TXDTX, speech frames, comprising a flag SP (Speech) in the control bits which indicates whether said frame comprises speech or whether a so called SID (Silence Descriptor) frame comprising data on background noise is in question, are continuously transmitted to the transmitting part. The SP flag is determined on the basis of a VAD flag provided from unit 2 indicating speech activity. When this flag has changed to zero, in other words when speech is no longer detected from the signal supplied from a user interface 3 (from a microphone), the SP flag is also changed to zero after the number of frames needed for computing background noise parameters, whereby a transmission unit TX still transmits the frame indicated by the zero flag and comprising the noise parameters to a base station via a radio path. Subsequently, the transmitter TX stops transmitting to the radio path, with the exception of the frame comprising noise data, transmitted at regular intervals. However, the TXDTX block continues to transmit frames comprising noise data to the transmitter TX constantly.

When the VAD function redetects speech in the voice signal supplied from the user interface 3, the SP flag changes its value to one, whereby the transmitter resumes continuous transmission.

In accordance with the invention, a detector 4 is arranged in the mobile station in FIG. 4 for detecting the control signal received by a receiver RX and a regulation unit 5 which in response to the control signal detected by the detector 4 regulates the parameters used in the VAD function in response to the data in the control signal. The parameters related to discontinuous transmission of the mobile station in FIG. 4 can thus be regulated in such a manner that in conjunction with discontinuous transmission, the mobile station is made to interpret the voice signals received from its user interface as background noise more easily than before.

FIG. 5 illustrates the VAD (Voice Activity Detection) function of the mobile station in FIG. 4. The VAD function is mainly based on the detection of the energy of a signal received through a microphone. In order to eliminate background noise, however, the signal is filtered first, whereupon the energy of the filtered signal is compared with a threshold value, and if the threshold value is exceeded it is noted that the voice signal received through the microphone comprises speech.

The VAD function thus provides a plurality of alternatives for the invention to be applied in such a manner that a mobile station can be made to identify a received signal as background voice (and not as speech) more easily than before. The method of the invention can thus be applied by regulating the threshold value, for instance, or alternatively by changing the parameters of the filter, for instance.

The VAD function shown in FIG. 5 is described in detail in the GSM Specification 06.32, which is incorporated herein by reference. The speech encoder of a mobile station computes the autocorrelation coefficients ACF required by the GSM Specifications 6.10, said coefficients being supplied to the VAD function by the speech encoder. Similarly, to the VAD function is supplied a long term predictor lag value N obtained from the speech encoder of the GSM specifications 6.10. A VAD flag, which affects the value of the SP flag described in conjunction with FIG. 4, is obtained from the VAD function for initial data.

It will be understood that the above description and the accompanying figures are only intended to illustrate the present invention. It will be apparent to those skilled in the art that the invention can be modified and varied in many ways without departing from the scope and spirit of the invention disclosed in the attached claims.

What is claimed is:

1. A mobile station comprising:
   transmission means and reception means for receiving and transmitting signals via a radio path;
   a user interface with a microphone for receiving sound signals;
   control means for utilizing discontinuous transmission, whereby the control means comprises signal processing means for processing the sound signals received through the microphone by utilizing filter parameters or a threshold value, which indicate how speech and background noise received via the microphone should be discriminated, and which are stored in the mobile station, in order to detect speech from the sound signals received through the microphone;
   detection means for detecting a predetermined control signal received by the reception means via the radio path; and
   regulation means, responsive to the detection means, for changing said filter parameters or said threshold value which indicate how speech and background noise received via the microphone should be discriminated and which are utilized in speech detection, in such a manner that the signal processing means interprets the sound signals received through the user microphone as background noise more seldom or more often.

2. A mobile communication system comprising:
   a mobile exchange;
   base stations in a data transmission connection to the mobile exchange;
   monitoring means for monitoring load in different parts of the system;
   control means responsive to the monitoring means for transmitting, via a radio path, a control signal to certain mobile stations or mobile stations in a certain area in order to regulate filter parameters or a threshold value which the mobile stations utilize for discriminating speech and background noise conveyed to a microphone in said mobile stations, when the monitoring means indicates that traffic load in some part of the system exceeds a predetermined limit; and
   mobile stations in radio connection to the base stations, said mobile stations comprising means for utilizing discontinuous transmission, and regulation means for regulating said filter parameters or said threshold value which the mobile stations utilize for discriminating speech and background noise conveyed to the microphone in response to receiving the control signal, in such a manner that said mobile stations interpret sound arriving at the microphone as background noise more often and transmit signals to the system more seldom.

3. A mobile communication system as claimed in claim 2, wherein the monitoring means is arranged to monitor an amount of free traffic capacity of the data transmission connection between at least one base station and mobile exchange belonging to the system, whereby the control means is arranged to transmit said control signal to all those mobile stations from which a traffic connection is in progress via said at least one base station, when the control means indicates that the free traffic capacity is below a predetermined limit value.

4. A mobile communication system as claimed in claim 3, wherein said data transmission connection between the base station and the mobile exchange is a packet switched data transmission connection.

5. A mobile communication system as claimed in claim 2, wherein the monitoring means is arranged to monitor an amount of free traffic capacity of a certain base station, whereby the control means is arranged to transmit said control signal to all those mobile stations from which a traffic connection is in progress via said certain base station, when the free traffic capacity is below a predetermined limit value.

6. A mobile communication system as claimed in claim 2, wherein the monitoring means is arranged to monitor quality of traffic channels of a certain base station, whereby the control means is arranged to transmit said control signal to all those mobile stations from which a traffic connection is in progress via said certain base station, when the quality of the traffic channels is below a predetermined limit.

7. A method of controlling the load in a mobile communication system in which at least one mobile station includes means for utilizing discontinuous transmission, comprising:
   monitoring traffic load in different parts of the mobile communication system,
   transmitting a control signal via a radio path to certain mobile stations or mobile stations in a certain area in order to regulate filter parameters or a threshold value which the mobile stations utilize for discriminating speech and background noise conveyed to a microphone in said mobile stations, when traffic load in some parts of the system exceeds a predetermined limit; and
   regulating, by regulation means of said mobile stations as a response to said control signal, said filter parameters or said threshold value which the mobile stations use for discriminating speech and background noise conveyed to the microphone in such a manner that the mobile stations interpret sound arriving at the microphone as background noise more often and transmit signals to the system more seldom.

* * * * *